United States Patent [19]
Piech et al.

[11] Patent Number: 5,613,188
[45] Date of Patent: Mar. 18, 1997

[54] INTERLACED CONDUCTOR/BACK-IRON SECONDARY FOR INDUCTION MOTORS

[75] Inventors: Zbigniew Piech, East Hampton; Robin M. Miller, Ellington; John L. Kettle, Vernon, all of Conn.

[73] Assignee: United Technologies Corporation, Hartford, Conn.

[21] Appl. No.: 515,191

[22] Filed: Aug. 15, 1995

[51] Int. Cl.$^6$ .................................................. B32B 9/00
[52] U.S. Cl. ........................... 428/547; 428/548; 428/652
[58] Field of Search .................................. 428/547, 548, 428/620, 652

[56] References Cited

PUBLICATIONS

Ciekot, Jerzy et al., "Infiltrated Iron Matrix Powder Composites for Magnetic Applications." Société Française de Métallurgie et de Matériaux, Colloquium: Powder Metallurgy Materials Featuring Specific Physical Properties, Apr. 6–8, 1992, pp. 12–1 – 12–6.

Blok, Henryk et al., "Soft Magnetic Powder composites for Magnetic Cores of Electrical Equipment." Société Française de Métallurgie et de Matériaux, Colloquium: Powder Metallurgy Materials Featuring Specific Physical Properties, Apr. 6–8, 1992, pp. 17–1 – 17–10.

Energy Research and Generation, Inc., brochure entitled "Duocel® Aluminum Foam".

Weglinski, Bogumil, "Soft Magnetic Powder Composites – Dielectromagnetics and Magnetodielectrics." ISSN 0379–0002, vol. 4, No. 2 1990, Reviews on Powder Metallurgy and Physical Ceramics, pp. 79–154.

Weglinski, Bogumil, "Sinters for Magnetic Applications." Institute of Electric Machine Systems, Technical University of Wroclaw, 1988, pp. 1–119.

*Primary Examiner*—Patrick Ryan
*Assistant Examiner*—Cathy F. Lam
*Attorney, Agent, or Firm*—Gerald L. DePardo

[57] ABSTRACT

An induction motor is provided with a secondary portion 20 comprising an interlaced conductor/back-iron (or ferromagnetic) portion 60 and a purely ferromagnetic back-iron portion 62. The interlaced portion 60 comprises an electrically conductive lattice (or foam) material 61 having pores 63 filled with a ferromagnetic material which results in two interlaced lattices 61,63 which are continuous through a shared volume. The interlaced region 60 provides both good magnetic permeability for passing magnetic flux 30 and good electrical conductivity for flowing induced electrical currents necessary for induction motors. As a result, the effective magnetic gap G1 is minimized while also providing a low-cost induction motor. Alternatively, the lattice 61 may be a ferromagnetic material which is embedded with a conductor.

20 Claims, 4 Drawing Sheets

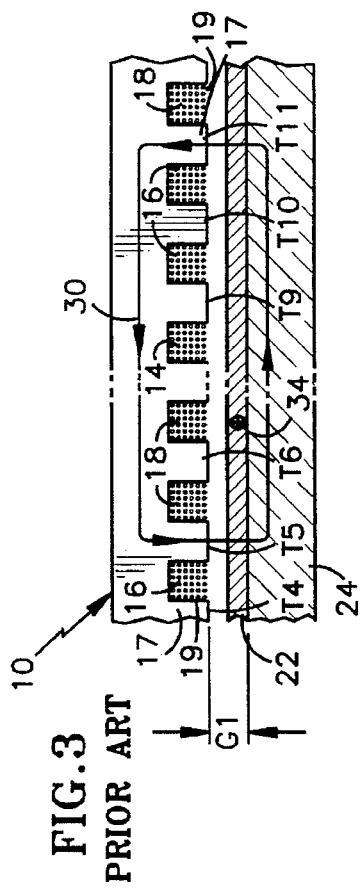
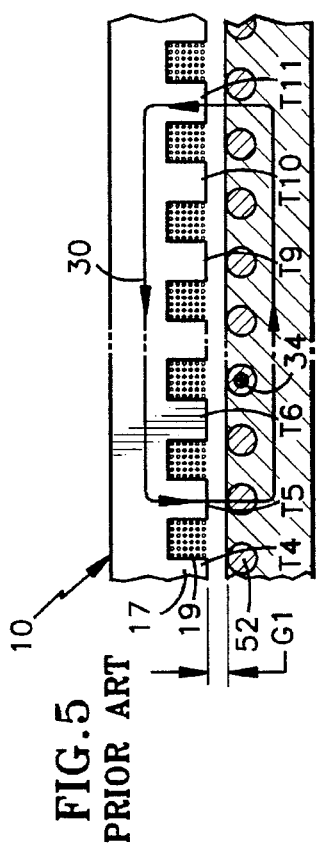
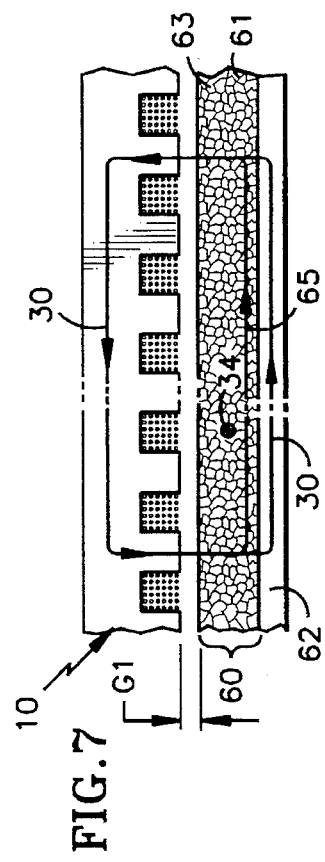
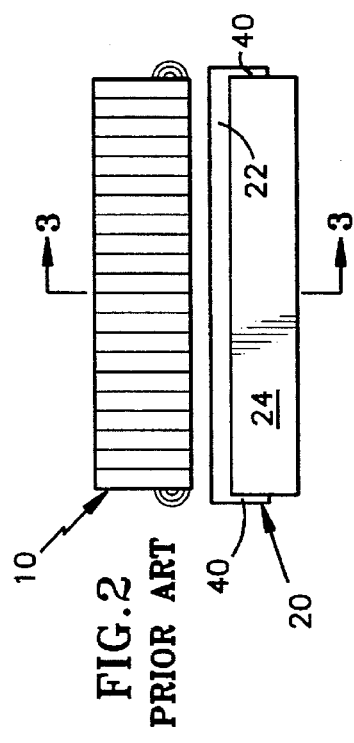
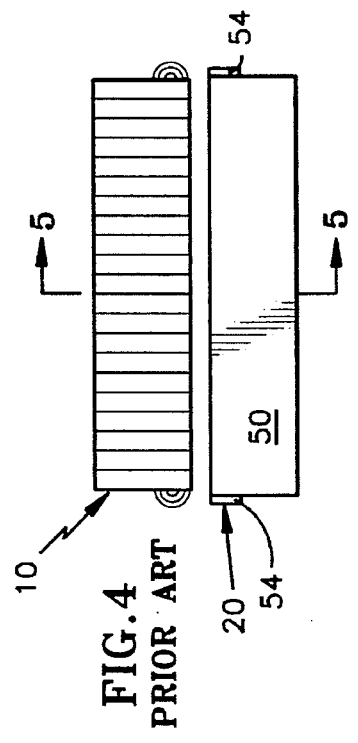
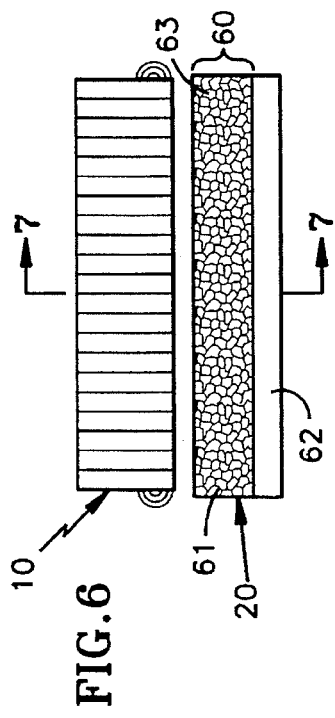

INTERLACED CONDUCTOR/BACK-IRON SECONDARY FOR INDUCTION MOTORS

DESCRIPTION

1. Technical Field

This invention relates to induction motors and more particularly to an improved secondary for an induction motor.

2. Background Art

It is known in the field of induction motors that an induction motor has a primary portion and a secondary portion separated by an air gap. The primary portion contains coils or windings which are embedded in slots and wrapped around teeth of a laminated core made of a highly ferromagnetic material. The secondary typically comprises an electrically conductive portion and a magnetically conductive (i.e., high permeability (permeance) or low reluctance) portion. Time varying magnetic field lines generated by the coils in the primary cross the air gap and enter the secondary where they travel along the magnetically conductive (or back-iron) portion of the secondary and back across the air gap to the primary core. These magnetic fields induce currents in the electrically conductive portion of the secondary because the magnetic field is changing with time. The induced currents generate a magnetic field which opposes the changing magnetic field from the primary. Such magnetic field will attract the secondary to the primary, which results in the secondary following the traveling magnetic field in the primary. The moving member of an induction motor may be either the primary portion or the secondary portion, depending on the design of the system. Also, an induction motor may be rotary or linear (e.g., flat, tubular, u-shaped), and may have a single-sided or double-sided primary, as is known. Also, the primary part may have many different shapes, e.g., for a linear motor it may be C-shaped or E-shaped core, or other shapes.

One configuration known in the prior art is to have the electrically conductive portion of the secondary face the gap and a back-iron portion attached to the conductor portion to provide for the magnetic flux flow (referred to herein as the "stacked" or "conductive sheet" configuration). Such a secondary is inexpensive to manufacture; however, it has the disadvantage of exhibiting an effective magnetic field gap of the air gap plus the thickness of the electrically conductive layer.

In general, it is desired to minimize the air gap between the primary and the magnetically conductive portion of the secondary so as to minimize the amount of current needed through the coils of the primary to provide a given output torque or thrust for the motor.

Thus, in the conductive sheet configuration, the thickness of the conductor is directly related to the performance, efficiency, and power required in the primary.

Another technique known in the art is to place electrically conductive rods (or bars) through the back-iron material at the air gap edge (referred to herein as the "conductive rod" or "lattice" configuration). Such a configuration provides alternating segments of an electrical conductor and a ferromagnetic material at the air gap, thereby providing a minimal air gap between the primary and the magnetically conductive (or high permeability) portion of the secondary, and providing good electrical conductivity for the flowing of the induced currents in the secondary portion. However, such a configuration, while efficient, is expensive to produce because of the cost associated with embedding or inserting the conductive rods into the back-iron material.

Thus, it would be desirable to provide an induction motor secondary which is more efficient than the conductive sheet technique, but less expensive than the conductive rod technique.

DISCLOSURE OF INVENTION

Objects of the invention include provision of an electrically conductive and magnetically conductive secondary which has less magnetic losses than using an electrical conductive sheet, but which is less expensive than placing conductive rods in the secondary.

According to the present invention an induction motor comprises a secondary portion, comprising conductive lattice means for having an electrical current induced therein and for allowing the flow of the current therein; and ferromagnetic lattice means, interlaced with the conductive lattice means, for allowing the flow of magnetic flux therein.

According further to the present invention, the conductive lattice means comprises an electrically conductive material having a density which varies over a region of the secondary.

According still further to the present invention, the ferromagnetic lattice means comprises a ferromagnetic material having a density which varies over a region of the secondary.

According still further to the present invention, the secondary further comprises a region of solely ferromagnetic material.

The invention represents a significant improvement over the prior art by using an interlaced electrically conductive/ magnetically conductive secondary. In particular, the electrically conductive material, e.g., copper or aluminum, is interlaced with a magnetically conductive (or high permeability or low reluctance) ferromagnetic (or back-iron) material, e.g., steel or iron, in such a way that two interlaced lattices exist, each being continuous through a shared volume. This is accomplished by embedding ferromagnetic material into an electrically conductive lattice (or foam) structure. Alternatively, an electrically conductive material may be embedded into a ferromagnetic lattice (or foam) structure. The mass and concentration percentages of the electrically conductive and ferromagnetic materials can be selected based on a given application. The interlaced region 60 provides both good magnetic permeability for passing magnetic flux and good electrical conductivity for flowing induced electrical currents necessary for induction motors. As a result, the invention provides a minimized magnetic air gap while being much less expensive than prior art induction motor secondarys having similar magnetic air gaps. Further, the intimate connection between the conductor and the back-iron is no longer a possible fatigue or noise problem due to the embedding. Still further, the invention provides improved thrust ripple over the prior art conductive rod technique (discussed hereinbefore) because of the more continuous nature of the magnetically conductive material at the air gap.

The foregoing and other objects, features and advantages of the present invention will become more apparent in light of the following detailed description of exemplary embodiments thereof as illustrated in the accompanying drawings.

BRIEF DESCRIPTION OF DRAWINGS

FIG. 2 is a front view of the prior art linear induction motor of FIG. 1.

FIG. 3 is a side cutaway view of the prior art linear induction motor of FIGS. 1 and 2.

FIG. 4 is a front view of an alternative prior art linear induction motor.

FIG. 5 is a side cutaway view of the prior art linear induction motor of FIG. 4.

FIG. 6 is a front view of a linear induction motor having an interlaced conductor/back-iron in accordance with the present invention.

FIG. 7 is a side cutaway view of the induction motor of FIG. 6 in accordance with the present invention.

BEST MODE FOR CARRYING OUT THE INVENTION

Figure 1:
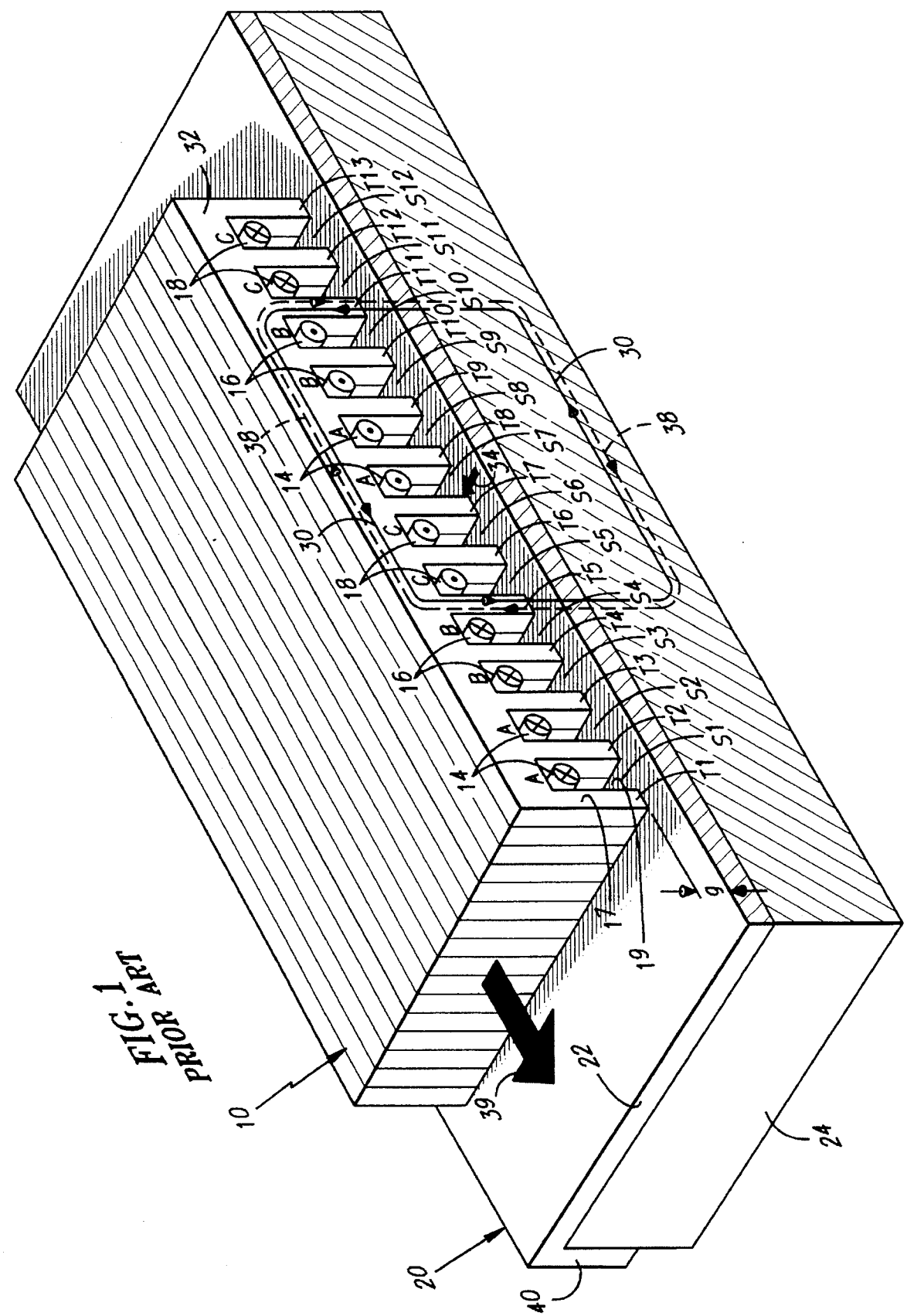
FIG. 1 is a partial cutaway perspective view of a prior art single-sided linear induction motor.

Referring to FIG. 1, a prior art linear induction motor comprises a laminated primary part 10 made up of primary core laminations 12 and having thirteen teeth T1–T13 and twelve slots S1–S12 between adjacent pairs of the teeth T1–T13. Coils 14–18 are wound through slots S1–S12 so as to create three phases, A, B, C. The coils 14–18 are shown in cross-section view and as a singular coil for illustrative purposes. The coils 14 making up phase A are wound together, the coils 16 making up phase B are wound together, and the coils 18 making up phase C are wound together (the connections between the windings are not shown).

Also, the induction motor comprises a secondary part 20 comprising an upper sheet or layer 22 of electrically conductive material, e.g., copper, and a lower or back-iron layer 24 made of a ferromagnetic material, e.g., steel or iron, connected or bonded to the electrically conductive layer 22. Any other high permeability or low reluctance ferromagnetic material may be used if desired.

Also, an air gap G exists between the lower surface of the teeth T1–T13 of the primary portion 10 and the upper surface of the layer 22 of the secondary portion 20.

Other numbers of phases, numbers of winding, numbers of teeth, and numbers of slots may be used if desired.

Electric current is supplied through the coils 14–18 so as to cause a magnetic flux 30 to flow between the primary 10 and the secondary 20. The direction of the current through the coils 14–18 is indicated by an "X" (cross) for current propagating into the page and a "•" (dot) for current propagating out of the page. For the three-phase configuration of FIG. 1 when phase A is a maximum, the magnetic flux 30 will be a maximum between the slots S4,S5 at the tooth T5 and a maximum in the opposite direction between the slots S10,S11 at the tooth T11. Magnetic flux 30 propagates down the tooth T5, across the gap G, and into the secondary where it passes through the conductive layer 22 and into the back-iron portion 24. The flux 30 travels along the back-iron 24, upward through the conductive layer 22, across the gap G to the tooth T11 of the primary 10. The flux 30 then travels along a back-iron portion 32 of the primary 10 and back to the tooth T5 to complete the magnetic flux 30 loop.

If the current through the coils 14–18 is changing with time, the flux 30 will also change with time. Also, if the flux 30 is changing with time in a positive direction, $d\emptyset/dt$ is greater than zero, such a time varying flux will induce a current in the conductor layer 22 as indicated by a line 34. The induced current 34 produces a flux 38 which opposes the increasing flux 30. The induced current 34 and the corresponding produced flux 38 has the effect of causing an attraction between the primary part 10 and the secondary 20. If, due to time varying current through the windings, the peak flux 30 propagates in the direction of an arrow 39 from the teeth T5,T11 to the teeth T4,T10, the induced flux 38 will cause an attraction between the tooth T4 and location on the secondary 20 where the induced flux 38 is located, thereby causing the secondary to "follow" the primary. This is a well known property of how torque and/or motion is created in an induction motor.

Referring now to FIGS. 1, 2, and 3, the electrically conductive portion 22 of the secondary 20 provides a path for the induced current 34 to flow. Additionally, as is known, edges 40 of the electrically conductive material 22 may be folded over the sides of the back-iron 24. This allows current to flow easily along the length of the secondary 20 and increases efficiency.

Referring to FIG. 3, the effective gap G1 seen by the magnetic flux 30 is the gap between the lower side of the teeth T1–T13 and the upper side of the back-iron 24, because the conductive material 22 appears effectively as air to magnetic flux. As such, the thickness of the layer 22 directly relates to the amount of power needed in the coils 14–18 to provide a certain amount of torque. Thus, it is desirable to minimize the gap G1 to maximize the amount of output torque for a given amount of current through the coils.

Referring now to FIGS. 4 and 5, an alternative prior art configuration comprises a secondary 20 with a back-iron 50 having electrically conductive rods 52 inserted therein at the upper surface of the back-iron 50. The conductive rods 52 are connected together at both ends by an electrically conductive rod 54. In this case, the gap G1 seen by the magnetic flux 30 is the distance between the lower surface of the teeth T1–T13 and the upper surface of the back-iron 50 which is located between the conductive rods 52. This configuration is extremely efficient; however, it is expensive to manufacture because it requires installing the conductive rods 52 into the back-iron 50.

Referring now to FIGS. 6 and 7 of the present invention, the induction motor secondary 20 comprises an interlaced conductor/back-iron (or ferromagnetic) material 60. In particular, the interlaced material 60 comprises an electrically conductive lattice (or foam) 61 made of an electrically conductive material, such as copper or aluminum or both, having interconnected pores (or holes or cells) 63 filled with a ferromagnetic (or back-iron) material, such as iron or steel. Thus, the lattice 60 actually comprises two interlaced lattices, the conductive lattice 61 and the ferromagnetic lattice 63, each of which are continuous through the shared interlaced region 60. Other materials for the electrically conductive and/or ferromagnetic materials may be used if desired. Below and contiguous with the interlaced conductor/ferromagnetic material 60 is a solely (or solid) ferromagnetic back-iron portion 62 connected thereto.

Referring to FIG. 7, the flux 30 passes into the interlaced conductor/back-iron 60 and travels along the ferromagnetic lattice 63 (as indicated by a line 65), as well as travels into and along the back-iron 62. As such, the magnetic gap G1 seen by the magnetic flux 30 is between the lower surface of the teeth T1–T13 and the upper surface of the interlaced conductor/back-iron 60, similar to that of the prior art "conductive rod" configuration of FIGS. 4 and 5. However, the cost to manufacture such interlaced conductor/back-iron material 60 is much less than that required for the conductive rod configuration. Also, the conductive lattice 61 passes the current 34 induced by the magnetic field 30, which in turn generates the magnetic attraction between the primary 10 and the secondary 20 (as discussed hereinbefore).

Figure 8:
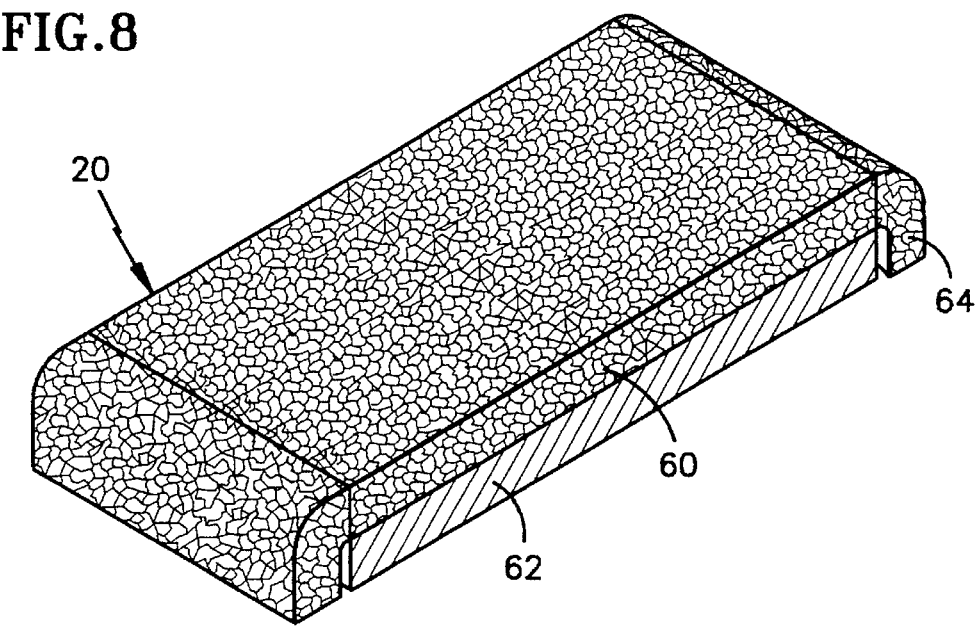
FIG. 8 is a perspective view of an interlaced conductor/back-iron secondary in accordance with the present invention.

Referring now to FIG. 8, additionally, there may be sides 64 of the interlaced conductor/back-iron 60 which are bent around the back-iron 62. The sides 64 provide electrical efficiency for the induced currents as discussed hereinbefore with regard to FIG. 2 of the prior art. Also, the sides 64 may have a much higher concentration of electrically conductive material or be a purely electrically conductive material (e.g., 100% copper) to provide maximum electrical efficiency for the induced currents.

Figure 9:
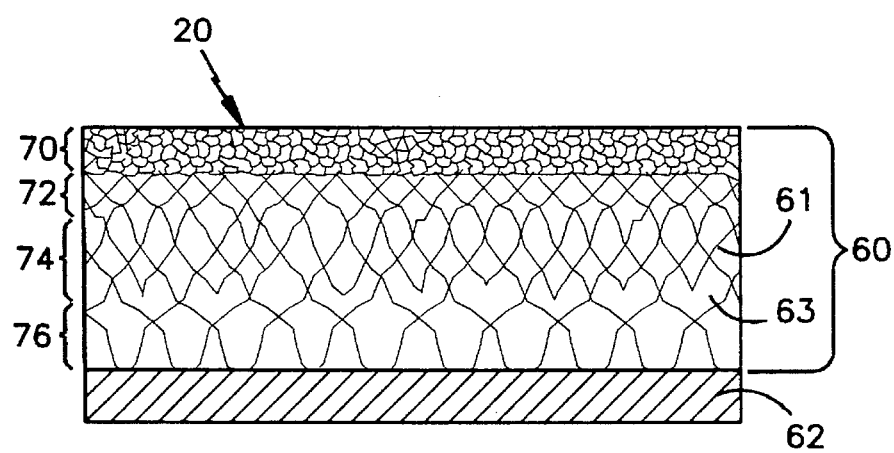
FIG. 9 is a side view of an electrically conductive lattice having a varied concentration of conductive material and of a lower back-iron layer in accordance with the present invention.

Referring to FIG. 9, in an alternative embodiment, instead of having a substantially constant density of the lattices 61,63, the lattice 61 may have a varying density from the top to the bottom of the region 60. In particular, in that case, a top region 70 at the gap G1 (FIG. 7) has a dense electrically conductive lattice, e.g., 70% conductive material by volume; a region 72 has a slightly less dense conductive lattice, e.g., 50% conductive material by volume; a region 74 below the region 72 is slightly less dense, e.g., 30% conductive material by volume; and a region 76 below the region 74 is still less dense, e.g., 20% conductive material by volume. Thus, when the ferromagnetic material is impregnated (or embedded) into the lattice 61 of FIG. 9, the region 76 will have a high density of ferromagnetic material, and the regions 74,72,70 will have decreasing densities of ferromagnetic material, respectively, with the region 70 having the lowest ferromagnetic density. If the density of the ferromagnetic material is high enough in the less dense lattice regions 74,76 to allow sufficient magnetic flux flow, the separate back-iron layer 62 may not be needed. More or less density regions, and other density values, may be used if desired. Also, the density variation need not change monotonically.

Figure 10:
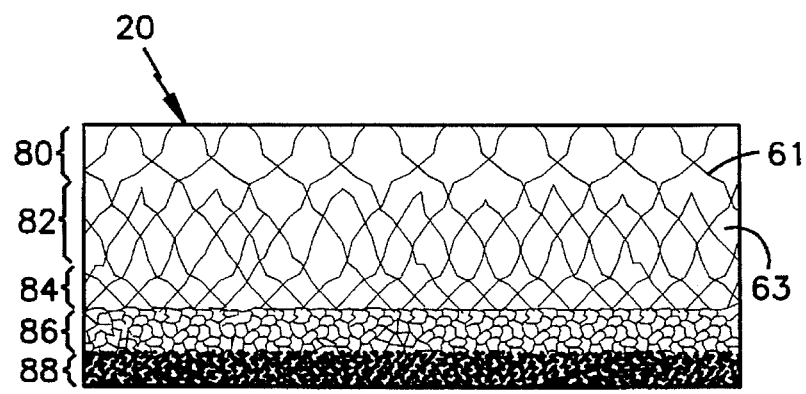
FIG. 10 is a side view of a ferromagnetic lattice having a varied concentration of ferromagnetic material in accordance with the present invention.

Referring to FIG. 10, alternatively, instead of having an electrically conductive lattice with ferromagnetic material embedded therein, the lattice 61 may be made of ferromagnetic material and an electrically conductive material may be impregnated therein. In that case, the density of the ferromagnetic lattice 61 would vary from a low density at the top to a high density near the bottom. In particular, a top region 80 at the gap G1 (FIG. 7) has a ferromagnetic lattice density which is very low, e.g., 10% ferromagnetic material by volume; a lower region 82 below the region 80, has a slightly more dense ferromagnetic lattice, e.g., 30% ferromagnetic material by volume; a region 84 below the region 82 has a slightly higher density of the ferromagnetic lattice, e.g., 50% ferromagnetic material by volume; a region 86 below the region 84 has a higher density ferromagnetic lattice, e.g., 80% ferromagnetic material by volume; and a bottom region 88 is a substantially solid portion of ferromagnetic material which would act as the back-iron portion 62. It may be possible to produce this type of varied ferromagnetic density lattice with a solid base in a single processing step. Also, more or less density regions, and other density values, may be used if desired. Also, the density variation need not change monotonically. Further, if the density of the ferromagnetic material is high enough in the more dense regions 84,86 to allow sufficient magnetic flux flow, the lower substantially solid back-iron layer 88 may not be needed.

Figure 11:
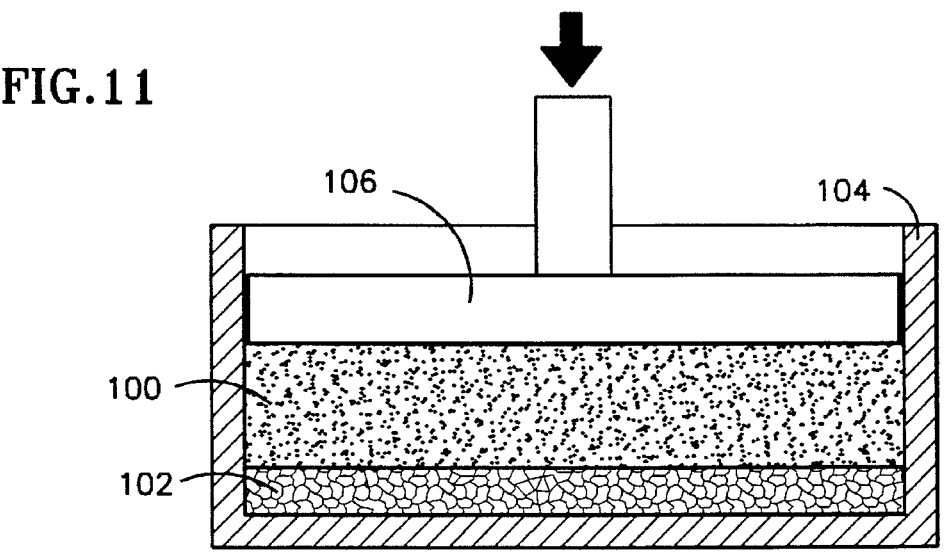
FIG. 11 is a side view of a device for impregnating particles into a lattice material in accordance with the present invention.

Referring to FIG. 11, a technique by which electrically conductive or ferromagnetic particles (or powder) 100 may be embedded into a lattice (or foam) material 102 comprises placing the lattice 102 in a container 104, then filling the container 104 with the particles 100 to impregnate the lattice. Next, pressure is exerted by a piston 106 or by other pressure techniques to force the particles 100 into the lattice 102 and to bind the particles together to create a second lattice interlaced with the first lattice 102. An oil lubricant may be applied to the inner walls of the container (or die) 104 to facilitate removal of the material after compression. Also, this process may be performed at elevated temperatures to further allow the particles to bind together. Furthermore, the particles 100 may be coated with an epoxy or binder which allows the particles to bind together (discussed more hereinafter). Also, some of the particles 100 may not be pushed into the lattice 102, thereby forming a solid layer (not shown) above the interlaced lattices which, when magnetic particles are used, could serve as the back-iron layer 62 of FIGS. 6,7,8.

Further, if it is required to increase the density of preformed lattice 102, pressure may be applied to the lattice to compress the lattice, thereby decreasing the pore size and increasing the density. Alternatively, the filaments making up the lattice may be plated with a plating material to reduce pore size. For example, an Aluminum lattice may be plated with a predetermined thickness of Copper thereby reducing the pore size and increasing the density of the conductive material. Similar techniques may be employed if the lattice is a ferromagnetic material.

In the case where the lattice 102 is a conductive material and the particles 100 are a ferromagnetic material having a melting point much higher than the lattice material 102, high pressure and low heat may be the best impregnation and solidification technique. However, where the lattice 102 is made of a ferromagnetic material having a much higher melting point than the electrically conductive particles 100 it may be possible to heat both the lattice 102 and the particles 100 such that the particles melt, coalesce, or otherwise bond together within the lattice 102. However, it should be understood that because conductive powders will oxidize, and thereby reducing electrical conductivity, the heating and/or pressure should be done without the presence of oxygen, e.g., in Nitrogen or Hydrogen or other non-oxygen environment.

The precise amount of pressure, heat and time needed to embed material into the lattice and for the powder to bind to together (or solidify) will vary based on the type of material to be embedded and on the desired density of the embedded material, as discussed hereinafter.

One type of ferromagnetic powder usable in the present invention is a magnetic powder composite. The primary component of a magnetic powder composite is an iron powder. Such magnetic powder composites can be divided into three categories: magnetic sinters, dielectro-magnetics, and magneto-dielectrics dielectro-magnetics and magneto-dielectrics refer to materials comprising a ferromagnetic material (primarily iron powder) and a dielectic material (plastics such as an epoxy resin). The dielectric acts as an electrical insulator and acts to bind the ferromagnetic particles together. In a dielectro-magnetic, the magnetic properties prevail over dielectric ones, whereas the opposite is true for magneto-dielectrics. In particular, a composite containing more than zero and up to 2% by weight of dielectric is typically considered a dielectro-magnetic and a composite containing more than 2% by weight of dielectric is typically considered a magneto-dielectric (typically greater than 10%). A composite containing zero dielectric is classified as a magnetic sinter (or a soft magnetic sinter).

Magneto-dielectrics and dielectro-magnetics are typically formed into a solid mass by casting or centrifuging. Whereas magnetic sinters are typically formed into a solid mass by sintering the iron powder at high temperature.

Regarding soft magnetic sinter composites, such composites are made of substantially pure iron powders, but may have impurities added to the powder to improve certain properties of the resulting solid. For example, Phosphorous (P) may be added to increase permeability, magnetic flux density saturation (Bs), and to decrease coercivity and hysteresis loss. Whereas, Silicon (Si) may be added to increase resistivity and decrease eddy current losses. The properties of magnetic sinters vary widely, but their average values are as follows:

Magnetic Flux Density Saturation: Bs=1.4 to 1.8 Tesla
Maximum Relative Permeability: $\mu$=3,000 to 15,000
Total Power Losses: $\Delta P_{1/50}$=15 to 45 Watt/kg (for B=1T, f=50 Hz); with ratio of eddy current loss to hysteresis losses $(\Delta P_{ec}/\Delta P_h)$>10.

Two examples of soft magnetic sinters are shown below:
(1) Fe(99.2%)P(0.8%):
Composition: ASC 100.29 iron powder Fe (made by Hoganas, Inc.) and Iron Phosphorides $Fe_3P$, for a total of 0.8% Phosphorus and 99.2% Fe.
Properties: compacting pressure=800 MPa (116 Kpsi); sintering temperature=1500° K. (1227° C.), sintering time=8 hours; minimum density=7.7 $Mg/m^3$; minimum permeability=14,000; maximum coercivity=32 A/m, minimum magnetic flux density saturation Bs=1.83 T, maximum total power loss $\Delta P_{1/50}$=21 W/Kg.
(2) Fe(50%)Ni (50%):
Composition: 50% alloyed Fe; 50% Ni powder.
Properties: compacting pressure=800 MPa (116 Kpsi); sintering temperature=1450° K. (1177° C.), sintering time=8 hours; minimum density=7.75 $Mg/m^3$; minimum permeability=15,000; maximum coercivity=16 A/m, minimum magnetic flux density saturation Bs=1.4, maximum total power loss $\Delta P_{1/50}$ =15.2 W/Kg, $\Delta P_{0.5/50}$=2.1 W/Kg.

Regarding dielectro-magnetic composites, such composites are made of a magnetic powder (e.g., iron) and a dielectric such as epoxy resin of about 0.1 to 2.0% by weight. A typical dielectro-magnetic composition is quasi-homogeneous and isotropic, and is made of a substantially pure iron powder with carbon content of about 0.003–0.005% and less than 2% of other impurities (e.g., silicon, phosphorous, nickel, etc.) which allow it to maintain good compressibility. The powder particles are spherical in shape and have a diameter of about 0.15 to 0.35 mim.

The amount of compacting pressure required for a dielectric-ferromagnetic powder mixture, as is known, depends on the weight content $\gamma=m_d/m_\mu$ of the dielectric used, where $m_d$ is the mass of the dielectric, and $m_\mu$ is the mass of the ferromagnetic powder. The value of the effective compacting pressure is determined by: $P_c=860/(100\gamma)^{0.11}$.

The average dielectric properties of dielectro-magnetic composites are as follows:
Compacting Pressure: $P_c$=400–1100 Mpa.
Magnetic Flux Density Saturation: Bs=1.0–1.5 Tesla
Maximum Permeability: $\mu$=300–900
Filling factor: kf=0.93–0.97
Resistivity: $\rho$=40–540 $\mu\Omega$m
Total Power Loss: $\Delta P_{1/50}$=7.5–10 Watt/kg (for B=1T, f=50 Hz); with the ratio of eddy current loss to hysteresis losses $(\Delta P_{ec}/\Delta P_h)$>1/10.
Depth of Electro-magnetic Wave Penetration: $\Delta d$=20 to 100 mm (for 50 Hz and $\mu$=max).

Two examples of dielectro-magnetic composites are shown below:
(1) Composition: 99.9% ASC 40.29 iron powder Fe (made by Hoganas, Inc.) and epoxy resin (Epidian 100) 0.1% by weight, oil lubrication applied to die wall interface.
Properties: compacting pressure=1100 MPa (160 Kpsi); density=7.62 $Mg/m^3$; maximum permeability=500; resistivity=36 $\mu\Omega$m; maximum total power loss $\Delta P_{1/50}$=8 W/Kg.
(2) Composition: 99.9% ASC 100.29 iron powder Fe (made by Hoganas, Inc.) and epoxy resin (Epidian 100) 1.0% by weight, oil lubrication applied to die wall interface.
Properties: compacting pressure=785 MPa (114 Kpsi); density=81 $Mg/m^3$; maximum permeability=300; resistivity=470 $\mu\Omega$m; maximum total power loss $\Delta P_{0.8/50}$=6.2 W/Kg, $\Delta P_{0.5/50}$=2.8 W/Kg, thermal conductivity=61.7 W/m° K.; Bending Strength=150 MPa; B(Tesla;magnetic flux density)-H (A/m; magnetic field intensity) curve data points=0.26–1000; 0.65–2,500; 1.01–5,000; 1.27–10,000.

Regarding magneto-dielectric composites, such composites are made of a magnetic powder (e.g., iron) and a dielectric such as epoxy resin of greater than (and typically much greater than) 2%, by weight. Such a composite does not have predominant magnetic features. Such composites are commonly used for closing open and semi-open slots of motor armatures.

Two examples of magneto-dielectric composites are shown below:
(1) Composition: 97% ASC 100.29 iron powder Fe (made by Hoganas, Inc.) and epoxy resin (Epidian 100) 3.0% by weight, oil lubrication applied to die wall interface.
Properties: compacting pressure=196 MPa (28 Kpsi); density=5.69 $Mg/m^3$; maximum permeability=71; resistivity=29,900 $\mu\Omega$m; maximum total power loss $\Delta P_{0.5/50}$=4.2 W/Kg; thermal conductivity=45.9 W/m° K.; Bending Strength=72 MPa, B(Tesla;magnetic flux density)-H(A/m; magnetic field intensity) curve data points=0.09–1000; 0.23–2,500; 0.42–5,000; 0.62–10,000.
(2) Composition: 90.0% ASC 100.29 iron powder Fe (made by Hoganas, Inc.) and epoxy resin (Epidian 100) 10.0% by weight, oil lubrication applied to die wall interface.
Properties: compacting pressure=588 MPa (85 Kpsi); density=5.36 $Mg/m^3$; maximum permeability=45; resistivity=$2.1\times10^8$ $\mu\Omega$m; maximum total power loss $\Delta P_{0.8/50}$=5.4 W/Kg, thermal conductivity=41.9 W/m° K.; Bending Strength=141 MPa, B(Tesla;magnetic flux density)-H(A/m; magnetic field intensity) curve data points=0.05–1000; 0.15–2500; 0.28–5000; 0.46–10,000.

Of the above mentioned magnetic sinters, dielectro-magnetics, and magneto-dielectrics, the most desirable for the present invention may likely be the dielectro-magnetic because it has high permeability (higher than the magneto-dielectric) and does not require extremely high temperatures (as does the magnetic sinters). As a result, it will interface well with a conductive lattice having a relatively low melting point.

More discussion on the characteristics of metal powders exists in the articles: Bogumil Weglinski, "Soft Magnetic Powder Composites—Dielectro-magnetics and Magneto-dielectrics", Reviews on Powder Metallurgy and Physical Ceramics, Vol. 4, No. 2, pp79–154 (1990); Bogumil Weglinski, "Siters for Magnetic Applications" (in English) Internal Report PRE no. 19/88, Wroclaw 1988, Electric Machine Systems Institute of Technical University of Wroclaw; Andrzej Kordecki et al, "Structures and Technology of Special Dielectro-magnetics", Colloquium: Powder Metallurgy Featuring Specific Physical Properties, Paris (Apr. 6–8, 1992); and Jerzy Ciekot et al, "Infiltrated Iron Matrix Powder Composites for Magnetic Applications", Colloquium: Powder Metallurgy Featuring Specific Physical Properties, Paris (Apr. 6–8, 1992).

Alternatively, the material to be embedded into the lattice may be a liquid which enters the pores of the lattice 102 (by, e.g., pouring, injecting, or dipping) and then solidifies (or hardens) therein (e.g., by allowing the liquid to cool). For example, for a conductor, liquid copper or liquid aluminum may be used. Other techniques may be used if desired to embed powdered or liquid material into the lattice 102. Also, other materials, temperatures and pressures may be used if desired.

Figure 12:
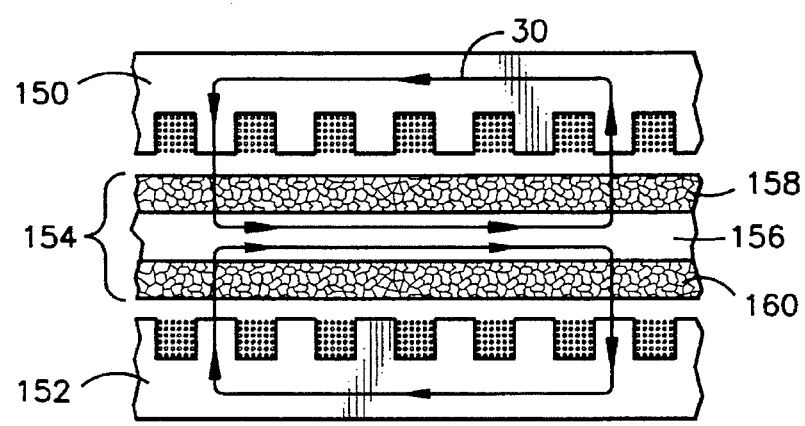
FIG. 12 is a side cutaway view of a double-sided primary linear induction motor having a secondary in accordance with the present invention.

Referring now to FIG. 12, the invention will also work with an induction motor having a double-sided primary. In that case, a first primary core 150 and a second primary core 152 are sandwiched around a secondary 154. The secondary 154 comprises a back-iron portion 156 sandwiched between two interlaced conductor/back-iron portions 158,160. The interlaced conductor/back-iron portions 158,160 may be fabricated in the same way as that discussed hereinbefore, together with the back-iron 156.

Figure 13:
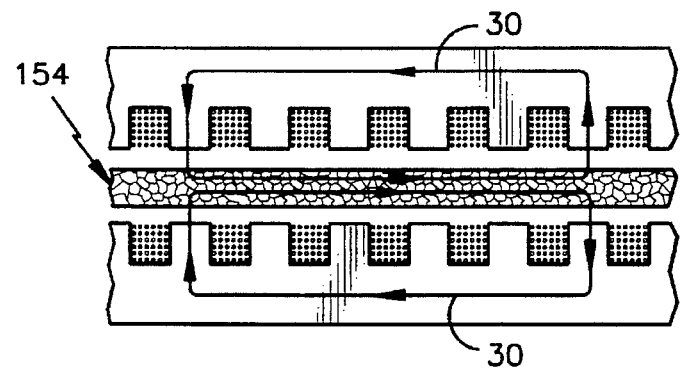
FIG. 13 is a side cutaway view of a double-sided primary linear induction motor having an alternative embodiment secondary in accordance with the present invention.

Referring now to FIG. 13, instead of the secondary 154 having a sandwiched-type arrangement as that shown in FIG. 12, the secondary 154 may be a single layer of interlaced conductor/back-iron. In that case, the density of the conductor and ferromagnetic portions may be adjusted as desired to provide the desired motor performance.

The lattice described herein may be obtained from many different suppliers, such as DUOCEL® Foam, by Energy Research and Generation, Inc., (ERG) of Oakland, Calif., for Aluminum foam and Copper foam, or FOAMETAL®, by Hogen Industries, Inc. a HI TecMetal Group Company(HTG)of Cleveland, Ohio.

While the invention has been described with a flat linear induction motor, it should be understood that the invention will work equally well with any form of induction motor, rotary or linear (e.g., flat, tubular, u-shaped). Also, the primary part may have many different shapes, e.g., for a linear motor it may be C-shaped or E-shaped core, or other shapes. Further, the moving member of the induction motor may be either the primary portion or the secondary portion, depending on the design of the system.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. An induction motor, comprising:
   a secondary portion, comprising:
      conductive lattice means, for having an electrical current induced therein and for allowing the flow of said current therein; and
      ferromagnetic lattice means, interlaced with said conductive lattice means, for allowing the flow of magnetic flux therein.

2. The induction motor of claim 1 wherein said conductive lattice means comprises an electrically conductive material.

3. The induction motor of claim 2 wherein the density of said conductive material varies over a region of said secondary.

4. The induction motor of claim 2 wherein said conductive material comprises copper.

5. The induction motor of claim 2 wherein said conductive material comprises aluminum.

6. The induction motor of claim 1 wherein said ferromagnetic lattice means comprises a ferromagnetic material.

7. The induction motor of claim 6 wherein the density of said ferromagnetic material varies over a region of said secondary.

8. The induction motor of claim 6 wherein said ferromagnetic material comprises iron.

9. The induction motor of claim 6 wherein said ferromagnetic material comprises steel.

10. The induction motor of claim 1 wherein said secondary further comprises a region of solely ferromagnetic material adjacent to and contiguous with said ferromagnetic lattice means.

11. An induction motor, comprising:
    a secondary portion, comprising:
       an electrically conductive lattice which allows an electrical current to be induced therein and allows said current to flow therein; and
       a ferromagnetic lattice, interlaced with said conductive lattice, which allows the flow of magnetic flux therein.

12. The induction motor of claim 11 wherein said conductive lattice comprises an electrically conductive material.

13. The induction motor of claim 12 wherein the density of said conductive material varies over a region of said secondary.

14. The induction motor of claim 12 wherein said conductive material comprises copper.

15. The induction motor of claim 12 wherein said conductive material comprises aluminum.

16. The induction motor of claim 11 wherein said ferromagnetic lattice comprises a ferromagnetic material.

17. The induction motor of claim 16 wherein the density of said ferromagnetic material varies over a region of said secondary.

18. The induction motor of claim 16 wherein said ferromagnetic material comprises iron.

19. The induction motor of claim 16 wherein said ferromagnetic material comprises steel.

20. The induction motor of claim 11 wherein said secondary further comprises a region of solely ferromagnetic material adjacent to and contiguous with said ferromagnetic lattice.

* * * * *